US008887602B2

(12) United States Patent
Weber

(10) Patent No.: US 8,887,602 B2
(45) Date of Patent: Nov. 18, 2014

(54) APPARATUS FOR HANDLING PORTIONS OF PRODUCTS

(75) Inventor: Günther Weber, Nemerow (DE)

(73) Assignee: Weber Maschinenbau GmbH Breidenbach (DE)

(*) Notice: Subject to any disclaimer, the term of this patent is extended or adjusted under 35 U.S.C. 154(b) by 396 days.

(21) Appl. No.: 13/072,086

(22) Filed: Mar. 25, 2011

(65) Prior Publication Data

US 2011/0232445 A1    Sep. 29, 2011

(30) Foreign Application Priority Data

Mar. 25, 2010   (DE) .......................... 10 2010 012 727

(51) Int. Cl.
| B26D 7/00 | (2006.01) |
| B26D 7/30 | (2006.01) |
| B26D 7/32 | (2006.01) |
| G01G 15/02 | (2006.01) |
| B65B 57/14 | (2006.01) |

(52) U.S. Cl.
CPC  *G01G 15/02* (2013.01); *B26D 7/30* (2013.01); *B26B 25/065* (2013.01); *B26B 25/068* (2013.01); *B65B 57/14* (2013.01); *B26D 7/32* (2013.01); *B26D 2210/02* (2013.01)
USPC ............. 83/23; 83/72; 83/77; 53/502; 99/537

(58) Field of Classification Search
USPC ............... 83/77, 932, 409, 76.7, 76.8, 73, 72; 53/435, 474, 502; 99/537, 589
See application file for complete search history.

(56) References Cited

U.S. PATENT DOCUMENTS

| 5,226,334 | A | * | 7/1993 | Pegoraro ........................... 83/42 |
| 5,787,776 | A | * | 8/1998 | Nishimoto ..................... 83/76.7 |
| 6,407,818 | B1 | * | 6/2002 | Whitehouse .................. 356/627 |
| 6,640,681 | B1 | * | 11/2003 | Weber ............................... 83/27 |
| 7,007,595 | B2 | * | 3/2006 | Ozery et al. ..................... 99/537 |
| 7,279,644 | B1 | * | 10/2007 | Kasel .......................... 177/25.13 |
| 7,937,913 | B2 | * | 5/2011 | Schill et al. .................... 53/502 |
| 2006/0162518 | A1 | * | 7/2006 | Biggs et al. .................... 83/75.5 |
| 2007/0202229 | A1 | * | 8/2007 | Nielsen ......................... 426/518 |
| 2008/0131253 | A1 | * | 6/2008 | Scott et al. .................... 414/729 |
| 2009/0249749 | A1 |  | 10/2009 | Schill |

FOREIGN PATENT DOCUMENTS

| DE | 37 11 688 A1 | 10/1988 |
| DE | 94 08 979 U1 | 8/1995 |
| DE | 102008009328 | 6/2009 |

OTHER PUBLICATIONS

Written Opinion for European Patent Application No. 11001994.0, dated Jul. 21, 2011, 7 pgs. (with English language translation).
German Search Report dated Nov. 16, 2010 issued in German Patent Application No. 10 2010 012 727.2, 4 pages, with English translation, 5 pages.
European Search Report with English language translation for pp. 1 and 5-6, dated Jul. 21, 2011, issued in European Patent Application No. 11001994.0, 10 pages.

* cited by examiner

Primary Examiner — Omar Flores Sanchez
(74) Attorney, Agent, or Firm — Cantor Colburn LLP

(57) ABSTRACT

An apparatus for handling portions of products, in particular food products, includes a product conveyor which conveys the portions sequentially along a conveying direction and at least one sensor which serves to determine the weight of the conveyed portions. The apparatus includes an automatic weight compensation unit which is arranged in the vicinity of the product conveyor and which serves additionally to place at least one single product on a portion in dependence on the determined weight of the portion.

17 Claims, 1 Drawing Sheet

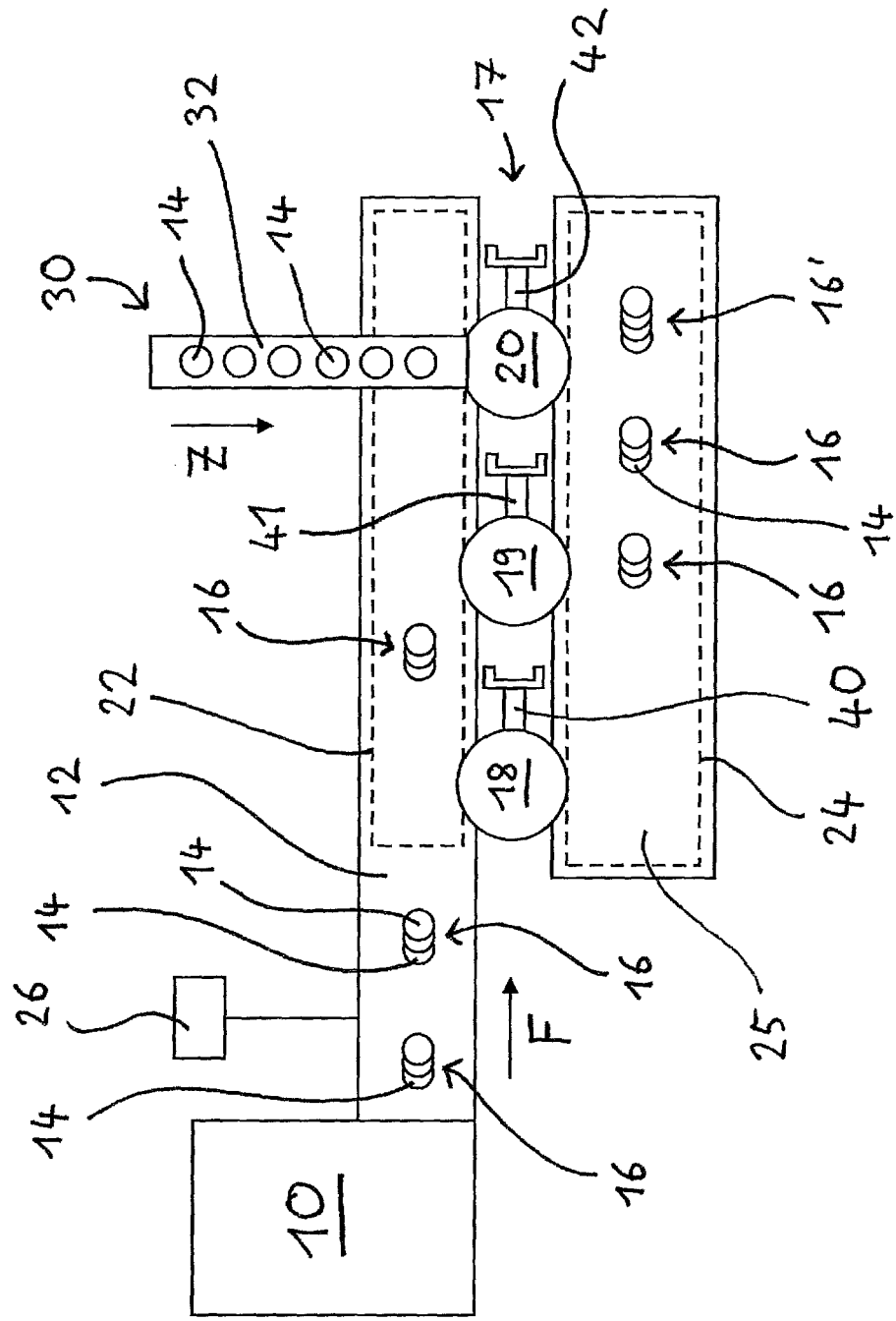

APPARATUS FOR HANDLING PORTIONS OF PRODUCTS

CROSS-REFERENCE TO RELATED APPLICATION(S)

This application claims priority from German Patent Application No. DE 10 2010 012 727.2, filed Mar. 25, 2010, entitled "APPARATUS FOR HANDLING PORTIONS OF PRODUCTS," which is fully incorporated herein by reference.

TECHNICAL FIELD

The present disclosure relates generally to an apparatus for handling portions of products and, more particularly, to an apparatus for handling portions of food products.

SUMMARY OF THE INVENTION

The present invention relates to an apparatus for handling portions of food products, the apparatus having a product conveyor which conveys the portions sequentially along a conveying direction and having at least one sensor which serves to determine the weight of the conveyed portions.

Such an apparatus can be used, for example, in the food industry to supply product slices cut off by a cutting apparatus, such as a high-performance slicer, portion-wise to a downstream processing apparatus, for example to a packaging machine. The weight of each conveyed portion is determined by means of the sensor. To ensure that only those portions are further processed which satisfy a preset weight specification, portions of incorrect weight are either sorted out or are brought to a required desired weight by a manual correction before the further processing. Both ultimately impair the efficiency of the production plant.

It is therefore an object of the invention to provide an apparatus which allows a more efficient handling of product portions.

This object is satisfied by an apparatus having a product conveyor which conveys the portions sequentially along a conveying direction and having at least one sensor which serves to determine the weight of the conveyed portions. In accordance with the invention, the apparatus further includes an automatic weight compensation unit which is arranged in the vicinity of the product conveyor and which serves additionally to add at least one single product to a portion in dependence on the determined weight of the portion. A low-weight portion can be brought to a desired or predetermined weight by the addition of single products, for example single cut product slices, to an existing portion. A sorting out or a manual correction of portions of incorrect weight is thus superfluous. The throughput of conveyed portions and thus also the efficiency of the total plant is increased by the automatic weight compensation.

The invention disclosed herein can be implemented in various ways, some examples of which are set forth in the description and shown in the accompanying drawing.

In accordance with an embodiment, a product supply separate from the product conveyor is associated with the weight compensation unit and sequentially provides single products to the weight compensation unit. The weight compensation unit in this way always has a sufficient number of individual products for a weight compensation. The separate product supply can, for example, be fed from the same cutting apparatus as the product conveyor or a separate cutting apparatus can be provided for the product supply.

The weight compensation unit can be configured to add at least one product to a portion if the determined weight of the portion is below a preset threshold value. As soon as a portion having too low a weight is therefore conveyed, the weight compensation unit ensures that the weight is adapted accordingly by addition of one or more single products.

The weight compensation unit is preferably configured to add a plurality of single products sequentially to a portion until the weight of the portion has reached a preset desired value. In this way, relatively very low-weight portions can also be brought to the wanted desired weight.

The product conveyor can be arranged downstream of a product processing apparatus preparing the portions, for example a cutting apparatus, with a control device ensuring that the prepared portions do not exceed a preset maximum weight. It is thus therefore achieved by means of the control device that only such portions are prepared and conveyed which are of the correct weight or of low weight within a tolerance range. It is ensured in this manner that a weight compensation can always be achieved by an addition of single products to a portion, while it is generally not necessary to remove single products from a portion. A particularly simple design of the weight compensation unit is hereby possible since no measures have to be taken to remove and, where necessary, to convey single products back.

In accordance with a further embodiment, the weight compensation unit includes a robot, in particular a robot working in accordance with the delta principle. The addition of single products to a portion can take place in that the robot picks up a single product from a product supply and places it on an underweight portion by means of a suitable end effector such as a product gripper or a vacuum suction apparatus.

The robot can additionally serve to pick up a conveyed portion and to place it in a placement area. The weight compensation unit can thus advantageously be realized by a robot which is anyway provided for transferring the conveyed portions. The robot in other words satisfies a dual function. Since the supplementing of underweight portions by additional single products is only necessary in individual cases with a suitable control of the product processing apparatus, such a dual-function use of the robot is possible without a problem.

In accordance with a further embodiment, at least one further robot is provided to pick up conveyed portions from the product conveyor and to place them in a placement area, wherein the placement area is preferably associated with a packaging machine or with a further conveying apparatus. An arrangement of a plurality of robots can therefore be provided to transfer conveyed portions from the product conveyor to, for example, a product placement area of a packaging machine or to a further product conveyor. At least one of these robots can in this respect satisfy the already mentioned dual function in that it not only serves for the transfer of products, but also for the compensation of the product weight. This robot is expediently provided with its own product supply and can be controlled in a suitable manner by means of a control device.

A product supply of the weight compensation unit can be configured as a product conveyor which conveys individual products sequentially along a supply direction, for example as a band conveyor. The supply of the single products can in this respect take place in a suitable direction transversely or parallel to the conveying direction of the conveyed product portions.

In accordance with a further embodiment of the invention, the product supply is arranged downstream of a cutting apparatus for preparing single products. This cutting apparatus is advantageously that cutting apparatus which also serves for the production of the conveyed product portions since in this manner no separate cutting apparatus has to be provided for the preparation of the single products for the weight compensation. An embodiment is, however, naturally also imaginable in which a separate cutting apparatus is associated with the weight compensation unit.

The invention also relates to a method for handling portions of products, in particular food products, in which the weight of a conveyed portion is determined by means of at least one sensor and at least one single product is additionally automatically added to the portion in dependence on the determined weight.

The invention will be described in the following by way of example with reference to the drawing.

BRIEF DESCRIPTION OF THE DRAWINGS

FIG. 1 shows a schematic plan view of an apparatus in accordance with the invention for handling portions of products.

REFERENCE NUMERAL LIST 10 slicer
12 band conveyor
14 product slice
16, 16' portion
17 transfer apparatus
18 first robot
19 second robot
20 third robot
22 pick-up area
24 placement area
25 product placement area
26 sensor
30 weight compensation unit
32 product supply
40 end effector of the first robot
41 end effector of the second robot
42 end effector of the third robot
F conveying direction
Z supply direction

DETAILED DESCRIPTION

An apparatus in accordance with the invention for handling portions 16 of food products such as slices of meat, sausage or cheese is shown in FIG. 1. A slicer 10 cuts off individual product slices 14 from a product loaf, not shown, at high speed and said individual product slices fall onto a band conveyor 12 and are conveyed by it along a conveying direction F. A control device, not shown, of the slicer 10 and/or of the band conveyor 12 provides that a plurality of cut-of product slices 14 in each case form a portion 16.

To transfer the portions 16 from the belt conveyor 2 to a product placement area 25 of a packaging machine not shown in detail, a transfer apparatus 17 is provided which includes a first robot 18 and a second robot 19. In addition, a third robot 20, whose function will be explained in more detail in the following, is disposed downstream of the first and second robots 18, 19 in the conveying direction F. In the example shown, the robots 18, 19, 20 are so-called "pick and place" robots with delta kinematics. The total number of the totality of robots provided is based on the respective required transfer performance. Three robots are shown here only by way of example.

The portions 16 are transported by the band conveyor 12 into a reception zone 22, are picked up by end effectors 40, 41 of the first two robots 18, 19 viewed in the conveying direction F and are transferred into a placement area 24 defined by the product placement area. In this respect, depending on the application, sorting procedures and/or the positioning of the portions 16 on the product placement area 25 to form a format set can be carried out as additional tasks. After their transfer, the portions 16 transferred into the placement area 24 are further transported in the conveying direction F.

The weight of the conveyed portions 16 is determined at a position disposed between the slicer 10 and the pick-up area 22 by means of a sensor 26. The sensor 26 can, for example, be electronic scales, an optical detection device or the like.

To avoid the output of portions 16 of incorrect weight, an automatic weight compensation unit 30 is provided which includes the third robot 20, i.e. that is the last robot viewed in the conveying direction F, as well as a product feed 32 separate from the band conveyor 12.

The product supply 32, which can be configured as a band conveyor or as a belt conveyor, sequentially conveys single product slices 14 along a supply direction Z to provide them for picking up by the third robot 20. The supply direction Z extends transversely to the conveying direction F in the embodiment shown. The product slices 14 for the product supply 32 can be placed on by hand, for example, or can be produced by a separate cutting system, not shown.

The slicer 10 and the band conveyor 12 are operated such that the prepared portions 16 do not exceed a preset maximum weight. It is therefore ensured—for example via the setting and/or control of the slicer 10 or of the band conveyor 12—that only portions 16 which are below weight and of correct weight within a tolerance range are produced, but in no way over-weight portions 16.

A control device, not shown, checks with reference to signals provided by the sensor 26 whether the respective determined weight of the portions 16 is below a preset threshold value. The control device therefore recognizes which of the portions 16 transferred by the first robot 18 and by the second robot 19 into the placement area 24 are underweight and which are not. Accordingly, the third robot 20—controlled by the control device—picks up a product slice 14 from the product supply 32 by means of an end effector 42 and places it in the placement area 24 on a portion 16 recognized as underweight as soon as it is conveyed past it. If the weight of a single product slice 14—known in advance—is not sufficient to bring the underweight portion 16 to the preset desired value, the third robot 20 sequentially places one or more further product slices 14 on the respective portion 16 until the weight of the portion 16 has reached the preset desired value.

With a sufficiently exact knowledge of the product loaf to be sliced and with a corresponding control of the cutting apparatus or of the product conveyor, it is possible to keep the weight of the conveyed portions 16 so exactly that a weight compensation is required only relatively rarely. In this case, the third robot 20 can be utilized not only for the automatic weight compensation, but also—corresponding to the first and second robots 18 19—additionally for the transfer of the portions 16 from the band conveyor 12 to the product placement area 25.

As a result therefore, due to the automatic weight compensation, only such portions 16 are output to the packaging machine whose weight corresponds to the wanted desired weight within a preset tolerance, wherein optionally single portions 16' can have a larger number of product slices 14 than other portions 16.

The number and use of the robots 18, 19, 20 as well as the number and arrangement of any further product supplies 32 can be adapted to the respective application in a variety of ways. It is thus possible, for example, to use the first robot 18 viewed in the direction of conveying F or a plurality of or all robots present for the weight compensation as required instead of the third robot 20. The weight compensation can equally be carried out on the band conveyor 12 or on the product placement area 25 depending on the application.

If instead of the third robot 20, the first robot 18 is, for example, used for the weight compensation, it is expedient to carry out the weight compensation on the band conveyor 12 instead of on the product placement area 25, i.e. that is to place additional product slices 14 on underweight portions 16 while they are still on the band conveyor 12. Only portions 16 of the correct weight are thus provided for transfer to the following robots 19, 20 in this constellation.

What is claimed is:

1. A method for handling portions of products by means of an apparatus having a product conveyor, at least one sensor, and an automatic weight compensation unit including a robot, the method comprising:
    cutting the product with a cutting apparatus to form portions having a predetermined weight;
    conveying the portions sequentially along a conveying direction by way of the product conveyor;
    determining the weight of the conveyed portions with the at least one sensor;
    transporting the conveyed portions, with the robot of the automatic weight compensation unit, if the conveyed portions are not below the predetermined weight, to a placement area where no further product is added to the portions; and
    automatically adding at least one single product to the conveyed portions with the robot of the automatic weight compensation unit if the conveyed portions are below the predetermined weight, based on the weight determined by the at least one sensor.

2. A method in accordance with claim 1, wherein said determining the weight comprises determining the weight of the conveyed portions with at least one sensor along the product conveyor at a location between the cutting apparatus and the automatic weight compensation unit.

3. An apparatus for handling portions of products, comprising:
    a product conveyor which conveys the portions sequentially along a conveying direction;
    at least one sensor which serves to determine the weight of the conveyed portions; and
    an automatic weight compensation unit which is arranged in a vicinity of the product conveyor, wherein the automatic weight compensation unit includes a robot which (a) serves to pick up conveyed portions from the product conveyor and is configured to place them in a placement area, and (b) additionally serves to add at least one single product to a portion in dependence on the determined weight of the portion.

4. An apparatus in accordance with claim 3, wherein the products comprise food products.

5. An apparatus in accordance with claim 3, wherein a product supply separate from the product conveyor is associated with the weight compensation unit and sequentially provides single products.

6. An apparatus in accordance with claim 5, wherein the product supply is arranged downstream of a cutting apparatus for preparing single products.

7. An apparatus in accordance with claim 3, wherein the weight compensation unit is configured to add at least one product to a portion if the determined weight of the portion is below a preset threshold value.

8. An apparatus in accordance with claim 3, wherein the weight compensation unit is configured sequentially to add a plurality of single products to a portion until the weight of the portion has reached a preset desired value.

9. An apparatus in accordance with claim 3, wherein the product conveyor is disposed downstream of a product processing apparatus preparing the portions, wherein a control device ensures that the portions prepared by the product processing apparatus do not exceed a preset maximum weight.

10. An apparatus in accordance with claim 3, wherein the robot works in accordance with delta kinematics.

11. An apparatus in accordance with claim 10, wherein the placement area is associated with a packaging machine or with a further conveying apparatus.

12. An apparatus in accordance with claim 10, wherein at least one further robot is provided to pick up conveyed portions and to place them in a placement area.

13. An apparatus in accordance with claim 12, wherein the placement area is associated with a packaging machine or with a further conveying apparatus.

14. A method for handling portions of products by means of an apparatus having a product conveyor, at least one sensor, and an automatic weight compensation unit, the method comprising:
    conveying the portions sequentially along a conveying direction by way of the product conveyor;
    determining the weight of the conveyed portions, wherein the weight of the conveyed portions is determined by means of the at least one sensor; and
    by means of the automatic weight compensation unit which includes a robot and is arranged in a vicinity of the product conveyor, (a) picking up, with the robot, the conveyed portions from the product conveyor and placing them in a placement area, and (b) automatically compensating, with the robot, the weight of the conveyed portions, including automatically adding, with the robot, at least one single product to a portion in dependence on the determined weight of the portion.

15. A method in accordance with claim 14, wherein the products comprise food products.

16. An apparatus in accordance with claim 9, wherein the product processing apparatus comprises a cutting apparatus.

17. An apparatus in accordance with claim 16, wherein the at least one sensor is positioned along the product conveyor between the cutting apparatus and the at least one robot.

* * * * *